US006731233B2

(12) United States Patent
Hofele et al.

(10) Patent No.: US 6,731,233 B2
(45) Date of Patent: May 4, 2004

(54) METHOD OF SUPPRESSING JAMMER SIGNALS

(75) Inventors: Franz-Xaver Hofele, Donzdorf (DE); Dieter Nagel, Erbach (DE); Klaus-Peter Schmitt, Bellenberg (DE); Markus Rothmaier, Lonsee (DE)

(73) Assignee: EADS Deutschland GmbH, Ulm (DE)

( * ) Notice: Subject to any disclaimer, the term of this patent is extended or adjusted under 35 U.S.C. 154(b) by 0 days.

(21) Appl. No.: 10/219,813

(22) Filed: Aug. 16, 2002

(65) Prior Publication Data

US 2004/0051658 A1 Mar. 18, 2004

(30) Foreign Application Priority Data

Aug. 17, 2001 (DE) .......................................... 101 40 498

(51) Int. Cl.[7] ................................................. G01S 7/36
(52) U.S. Cl. ......................... 342/17; 342/159; 342/162; 342/196; 342/379
(58) Field of Search ............................... 342/13, 16, 17, 342/18, 19, 39, 159, 162, 196, 379

(56) References Cited

U.S. PATENT DOCUMENTS

| | | | | |
|---|---|---|---|---|
| 4,246,585 A | * | 1/1981 | Mailloux | .................... 343/854 |
| 4,672,378 A | * | 6/1987 | Drabowitch et al. | .......... 342/17 |
| 4,720,712 A | | 1/1988 | Brookner et al. | |
| 5,245,347 A | | 9/1993 | Bonta et al. | ................. 342/149 |
| 5,841,395 A | | 11/1998 | Simone | |
| 6,268,821 B1 | * | 7/2001 | Shrader et al. | ................ 342/17 |

OTHER PUBLICATIONS

"Steady state analysis of the generalized sidelobe canceller by adaptive noise cancelling techniques", Jablon, N.; Antennas an Propagation, IEEE Trans. on [legacy, pre—1988], Vol: 34 Issue: 3, Mar. 1986 Ps: 330–337.*

"Algorithmic, architectural, and beam pattern issues of sidelobe cancellation", Yuen, S.M.; Aerospace and Electronic Systems, IEEE Transactions on, vol.: 25 Issue: 4, Jul. 1989 Page(s): 459–472.*

"Adaptive beam forming without signal cancellation in the presence of coherent jammers", Lee, J.–H.; Wu, J.–F.; Radar and Signal Processing [see also IEE Proceedings–Radar, Sonar and Navigation],IEE Procs F, Vol: 136 Issue: 4, Aug. 1989 Ps: 169–173.*

"Reducing the interference between sidelobe cancellers and sidelobe blankers in electronic scanning array radars", Chin, J.E.; Liebman, P.M.; Fleming, J.E.; Radar Conference, 1989., Proceedings of the 1989 IEEE National, Mar. 29–30, 1989 Ps: 141–146.*

*Theory and Application of Digital Signal Processing*, Lawrence R. Rabiner and Bernard Gold, 1975, Bell Telephone Laboratories, Inc. & Lincoln Laboratory, pps.363 and 574.

*Adaptive Arrays with Main Beam Constraints*, Sidney P. Applebaum and Dean J. Chapman, IEEE Transactions on Antennas and Propagation, Vol AP24, No. 5, sep. 1976, pps.650–662.

H. Hikawa et al. "Jamming Cenceler Using Interpolated FFT" IEEE—Int'l Conference on Communications (1990) pp. 1275–1279.

* cited by examiner

Primary Examiner—John B. Sotomayor
(74) Attorney, Agent, or Firm—Crowell & Moring LLP

(57) ABSTRACT

In a method of suppressing jammer signals in the received signal of radar antennas of HPRF applications (such as pulse Doppler radar systems) by means of Fast Fourier Transformation and side lobe cancellation, the receiving radar antenna has a sum channel, a difference channel and an auxiliary channel. The received signal is first transformed in the sum, difference and auxiliary channels from the time domain into the frequency domain using a Fast Fourier Transformation (FFT). Subsequently, the the jammer signal, particularly the side lobe jammer, is suppressed in the frequency domain by means of side lobe cancellation.

9 Claims, 2 Drawing Sheets

METHOD OF SUPPRESSING JAMMER SIGNALS

BACKGROUND OF THE INVENTION

This application claims the priority of German patent document 101 40 498.0, filed Aug. 17, 2001, the disclosure of which is expressly incorporated by reference herein.

The invention relates to a method of suppressing jammer signals included in the signal received by a radar antennas of HPRF (high pulse repetition frequency) applications.

Interfering signals occurring in radar technology fall into two categories: wanted and unwanted. Wanted interfering signals include the jammer signal. Particularly in the military sector, a wanted interference (jammer signal) due to an electronic countermeasure may be desirable for protecting the target from being located and tracked. For this purpose, the target emits interfering and false signals which are superimposed on the useful signals at the radar unit, in order to generate faulty information concerning the target, and therefore inducing the enemy to take measures which are ineffective.

Unwanted interfering signals, also called clutter or noise signals, are generally signals which are generated by the reflection or scattering, for example, of energy beamed onto the surface of the earth.

The jammer signal is mainly captured by way of the side lobes of the radar antenna and is relatively strong on the basis of the $1/R^2$ law. In order to suppress this signal—also called side lobe jammer—, an adaptive side lobe canceller is used (S. P. Applebaum, "Adaptive Array", *IEEE Transactions of Antenna and Propagation*, Vol. AP-24, No. 5, September 1976). This latter canceller is based on the existence of a sum channel, a difference channel and an auxiliary channel of the radar antenna, with the auxiliary channel having an isotropic antenna diagram, particularly 30–40 dB under the maximum of the major lobe of the antenna.

FIG. 1 illustrates a known technique for suppressing the side lobe jammer. The signal is received by the radar antenna in the time domain. In the further signal processing, the sum S, difference D and auxiliary channel G are subjected to a recursive clutter filter CF which suppresses the clutter signal. Subsequently, a side lobe cancellation for the three channels S,D,G is carried out by means of a side lobe canceller SC. Finally, in the case of the known technique, the signals of the three channels S, D, G are transformed in a Fast Fourier Transformation (FFT) from the time domain into the frequency range. For computing an FFT, normally signal processors with a floating-point arithmetic are used, whereby a more precise computation of the FFT can be carried out than by means of fixed-point processors.

However, the use of a high-expenditure recursive clutter filter when a subsequent FFT takes place has proven to be disadvantageous. In addition, this method is very sluggish and can react only slowly to changes of the side lobe jammer.

SUMMARY OF THE INVENTION

It is an object of the invention to provide a method for suppression of the side lobe jammer that is simple and fast.

This and other objects and advantages are achieved by the method according to the invention, in which a signal received by the radar antenna is first processed to form sum, difference and auxiliary channels which are then transformed from the time domain into the frequency, domain using a Fast Fourier Transformation. Subsequently, in the frequency domain, the jammer signal, particularly the side lobe jammer, is suppressed by means of side lobe cancellation.

This arrangement has the advantage that the processing of the signals in the side lobe canceller can take place more easily and faster in the frequency domain than in the time domain according to the prior art. Another advantage of the method according to the invention is the fact that complicated recursive clutter filters are required.

Other objects, advantages and novel features of the present invention will become apparent from the following detailed description of the invention when considered in conjunction with the accompanying drawings.

DETAILED DESCRIPTION OF THE INVENTION

Figure 1:
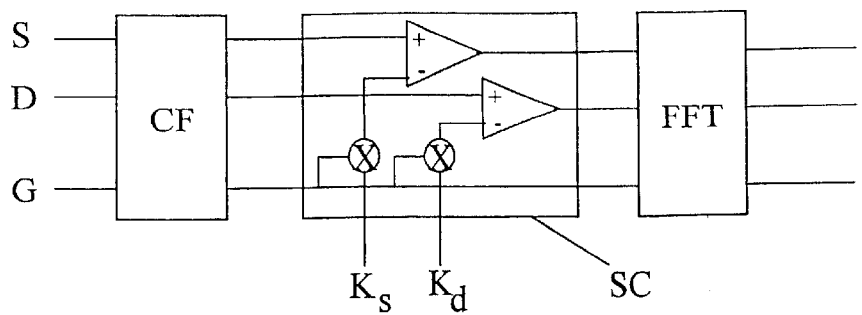
FIG. 1 (prior art) illustrates a known method of suppressing the side lobe jammer by means of side lobe cancellation.
Figure 2:
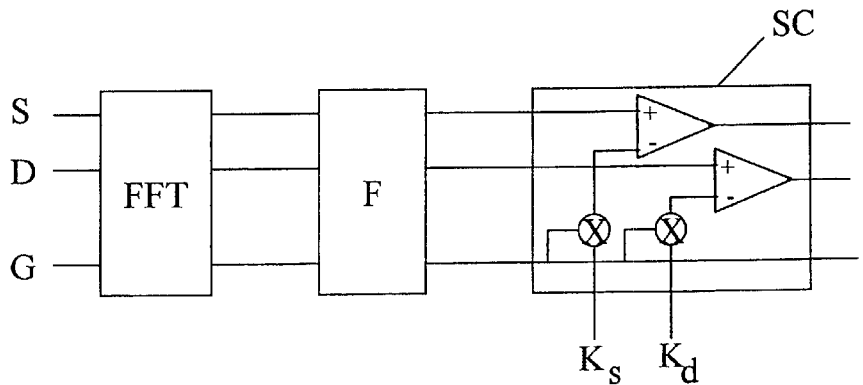
FIG. 2 shows the method according to the invention for suppressing the side lobe jammer by means of side lobe cancellation, the FFT being carried out before the side lobe cancellation.

FIG. 2 illustrates the method according to the invention for suppressing the jammer signal by means of side lobe cancellation. The signals from the sum S, difference D and auxiliary channel G are transformed in an FFT from the time domain into the frequency domain. Subsequently, in an advantageous embodiment of the invention, in the three channels S, D, G, the clutter signal, which is present in the frequency domain $\pm 2V_r/\lambda$ ($V_r$ being the speed of the HPRF application and $\lambda$ is the wavelength of the received signal), is filtered out in a simple filter F. Then the filtered signals S,D,G are fed to a side lobe canceller SC in which the side lobe jammer is suppressed. For the computations, scaling factors $K_s$ and $K_d$ are used which are obtained from the auxiliary channel G.

Figure 3:
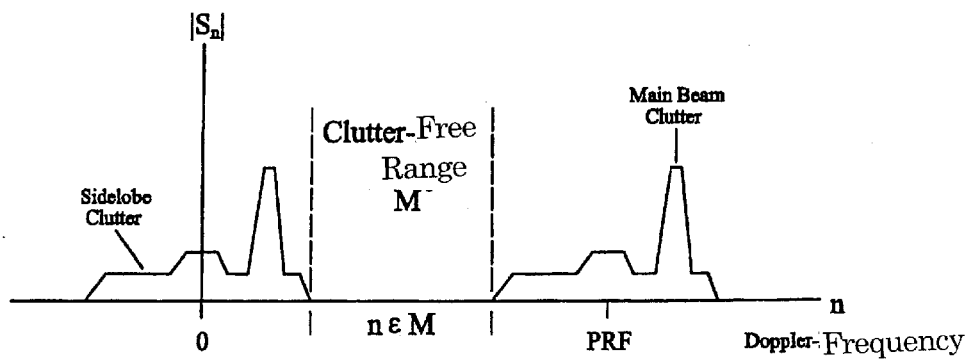
FIG. 3 is a simplified view of a frequency spectrum, as an example, for the sum channel $S_n$ in an HPRF environment, with a clutter-free range.

As an example for the sum channel $S_n$, FIG. 3 shows, in a considerably simplified manner, a frequency spectrum in an HPRF situation with a clutter-free range M. In this case, the sum channel $S_n$ is illustrated by way of the scanned Doppler frequency with the pulse repetition frequency PRF as an unambiguity range. In addition, the area of the side lobe clutter and of the major lobe clutter, also called main beam clutter, is visible.

It is advantageous in this case that, after the FFT, the signals are present in the frequency domain and thus the range of the clutter signals can be cut out without high-expenditure filters, such as elliptical clutter filters.

It is known that the radar antenna receives signals in a chronological sequence. Thus, it is assumed that $s_k$, $d_k$ and $g_k$ are the signal sequences of scanning values of the sum, difference and auxiliary channel in the time domain. By means of the FFT, these signal sequences can be transformed from the time domain into the frequency domain, wherein $S_n$, $D_n$ and $G_n$ are the scanning values of the sum, difference and auxiliary channel in the frequency range, with n=0, 1, 2, 3 . . . N−1. This FFT is also called N-points FFT, wherein the following applies:

$$S_n = FFT(s_k),\ D_n = FFT(d_k),\ G_n = FFT(g_k).$$

Figure 4:
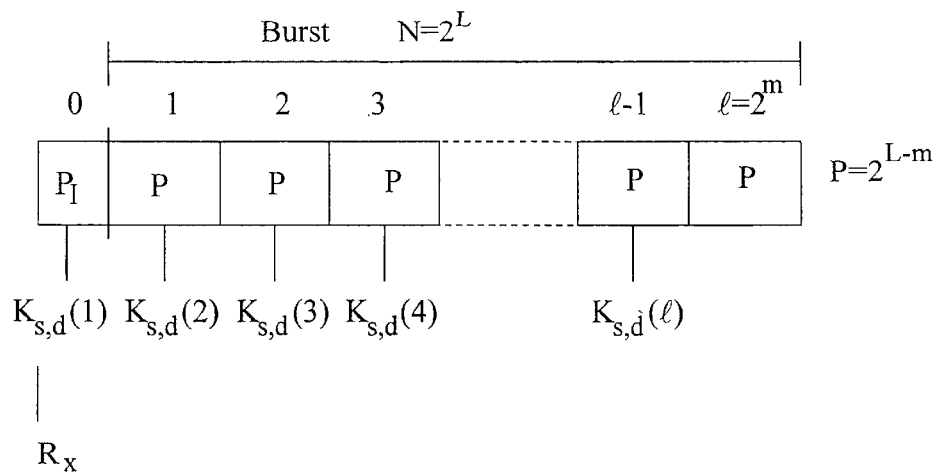
FIG. 4 is a view of a burst divided into sub-bursts for the FFT, with an initialization phase initiating the method according to the invention.

The FFT is advantageously carried out in a so-called burst (FIG. 4). A burst comprises N scanning values with $N=2^L$ and $L \in |N$. The burst is advantageously divided into l sub-bursts with $l=2^m$ and $m \in (0,1,2,3,4)$ of the length P. The length P of the individual sub-bursts is computed from $P:=N/l=2^{L-m}$. In this case, N, l and P are particularly a power of 2.

It is therefore possible, in a simple and fast FFT process, to transform the signal sequences present in the time domain in sum, difference and auxiliary channels into the frequency domain. In particular, this can be implemented by performing, for each burst, a total of l FFTs of the length P. This approach is also called a "decimation in time FFT".

This therefore means that, within the individual sub-bursts, the scanning values are present in the frequency domain. However, the sub-bursts themselves are subjected to a chronological sequence within the higher-ranking burst.

In an advantageous embodiment of the invention, the suppression of the side lobe jammer takes place in the individual sub-bursts i with i=1 . . . l, by means of side lobe cancellation. The following computations are carried out for each sub-burst i:

$Y_n^S(i) = S_n(i) - K_s(i)^* G_n(i)$ for the sum channel and $Y_n^D(i) = D_n(i) - K_d(i)^* G_n(i)$ for the difference channel.

In this case, as described above, $S_n(i)$, $D_n(i)$, $G_n(i)$ are the scanning values n=0, 1, 2, . . . N−1 of the sum, difference and auxiliary channel in the frequency range, and i=1 . . . P are the sub-bursts. $K_s(i)$ and $K_d(i)$ are the scaling factors for the sum and difference channel of the sub-burst i.

The coefficients $K_s$ and $K_d$ are stationary only for a very defined time domain. Because of the repeated scanning of the radar antenna, however, the conditions for the coefficients $K_s$ and $K_d$ will change. Thus, the coefficients have to be adapted continuously. Such an adaptation may also be required during the FFT.

Figure 5:
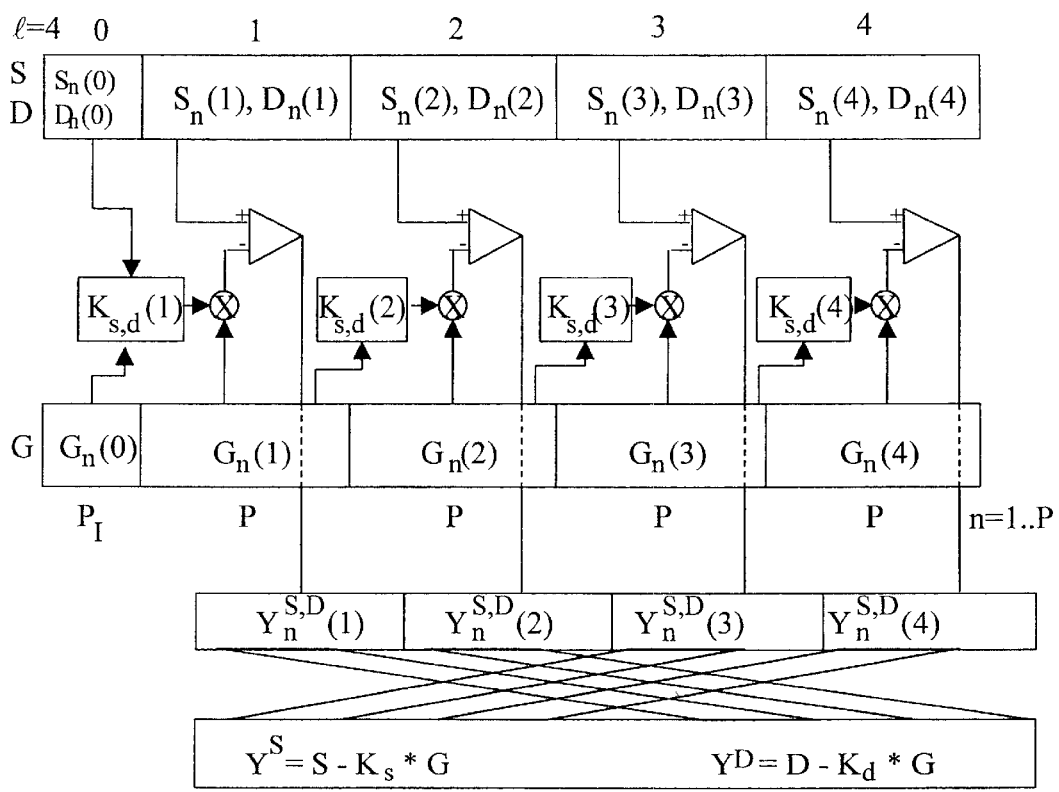
FIG. 5 is an example which illustrates the combining of the individual sub-bursts.

The individual sub-bursts i with i=1 . . . l (l sub-bursts resulting in one burst, as mentioned above), are subjected to a chronological sequence (FIG. 4), whereas the scanning values within the sub-bursts are present in the frequency domain. The scaling factors $K_s(i+1)$ and $K_d(i+1)$ are advantageously determined in a sub-burst i with i=1 . . . l−1 and are used for the suppression of the side lobe jammer in the chronologically directly following sub-burst i+1 with i=1 . . . l−1 (FIG. 5). The computation of the scaling factors for the sub-bursts i+1 with i=1 . . . l−1 advantageously takes place according to the following rule:

$$K_s(i+1) = \frac{\sum_{n \in M} S_n(i) \cdot G_n^*(i)}{\sum_{n \in M} G_n(i) \cdot G_n^*(i)} \text{ and } K_d(i+1) = \frac{\sum_{n \in M} D_n(i) \cdot G_n^*(i)}{\sum_{n \in M} G_n(i) \cdot G_n^*(i)}$$

with i=1 . . . l−1.

M indicates the quantity of the Doppler bins which are not occupied by clutter. $G_n^*(i)$ indicates the conjugate complex scanning values of the corresponding auxiliary channel $G_n(i)$.

To determine the scaling factors $K_s(1)$ and $K_d(1)$, which are used for suppressing the side lobe jammer in the first sub-burst i=1, an initialization phase is advantageously carried out. The length $P_I$ of this initialization phase is advantageously shorter than the length P of the individual sub-bursts i. The scaling factors $K_s(1)$ and $K_d(1)$ are advantageously computed according to the following rule:

$$K_s(1) = \frac{\sum_{n \in M} S_n(0) \cdot G_n^*(0)}{\sum_{n \in M} G_n(0) \cdot G_n^*(0)} \text{ and } K_d(1) = \frac{\sum_{n \in M} D_n(0) \cdot G_n^*(0)}{\sum_{n \in M} G_n(0) \cdot G_n^*(0)}$$

Preferably, the scaling factors $K_s(1)$ and $K_d(1)$ are computed directly after the switching-on of the receiver $R_x$. In further signal processing, the data of the initialization phase will not be needed.

As an example of a burst divided into 4 sub-bursts (thus, l=4), FIG. 5 shows the course of a so-called adaptive processing. The scaling factors $K_{s,d}(1)$ determined in an initialization phase $P_I$ are used in the first sub-burst l=1 for the computing of $Y_n^S(1)$ and $Y_n^D(1)$. As described above, the computation of $Y_n^S(1)$ and $Y_n^D(1)$ for the sum and difference channel takes place according to the following rule:

$Y_n^S(1) = S_n(1) - K_s(1)^* G_n(1)$ $Y_{nD}(1) = D_n(1) - K_d(1)^* G_n(1)$

Subsequently, in the first sub-burst, the scaling factors $K_{s,d}(2)$ are determined, and thus the scaling factors for the immediately following second sub-burst with l=2. The immediately following process in the second sub-burst corresponds essentially to the above-described process in the first sub-burst.

The individual data $Y_n^{S,D}(1)$ to $Y_n^{S,D}(4)$ of the sum and difference channel computed in the four sub-bursts are advantageously combined to a final value $Y_n^S$ and $Y_n^D$ for the corresponding burst. The individual data of the individual sub-bursts are combined by means of corresponding twiddle factors. L. R. Rabiner and B. Gold, "Theory and Application of Digital Signal Processing", Prentice Hall, Inc. Englewood Cliffs, N.J., 1975, Pages 363 and 574.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of suppressing jammer signals in a received signal of a radar antenna in an HPRF application, by means of Fast Fourier Transformation and side lobe cancellation, the radar antenna comprising sum, difference and auxiliary channels, said method comprising:

transforming the received signal in sum, difference and auxiliary channels, from the time domain into the frequency domain using a Fast Fourier Transformation;

filtering a component of the received signal after said transforming; and suppressing the jammer signal by means of side lobe cancellation, in the frequency domain.

2. The method according to claim 1, wherein the HPRF application comprises Doppler radar.

3. The method according to claim 1, wherein the jammer signal is a side lobe jammer.

4. A method of suppressing jammer signals in a received signal of a radar antenna in an HPRF application, by means of Fast Fourier Transformation and side lobe cancellation, the radar antenna comprising sum, difference and auxiliary channels, said method comprising:

transforming the received signal in sum, difference and auxiliary channels, from the time domain into the frequency domain using a Fast Fourier Transformation;

suppressing the jammer signal by means of side lobe cancellation, in the frequency domain;

wherein after the FFT, for the elimination of clutter signals, the frequency range $\pm 2V_r/\lambda$, is filtered out of the frequency spectrum of the received signal, wherein $V_r$ is the speed of the HPRF application and $\lambda$ is the wavelength of the received signal.

5. A method of suppressing jammer signals in a received signal of a radar antenna in an HPRF application, by means of Fast Fourier Transformation and side lobe cancellation, the radar antenna comprising sum, difference and auxiliary channels, said method comprising:

transforming the received signal in sum, difference and auxiliary channels, from the time domain into the frequency domain using a Fast Fourier Transformation;

suppressing the jammer signal by means of side lobe cancellation, in the frequency domain;

wherein the Fast Fourier Transformation takes place in a burst comprising N scanning values with $N=2^L$ and $L \in |N$, the burst being divided into l sub-bursts with $l=2^m$ and $m \in (0,1,2,3,4)$ of the length P.

6. The method according to claim 5, wherein, to suppress the side lobe jammer by means of side lobe cancellation in the individual sub-bursts i with $i=1 \ldots l$, the computation $Y_n^S(i)=S_n(i)-K_s(i)*G_n(i)$ for the sum channel (S) and $Y_n^D(i)=D_n(i)-K_d(i)*G_n(i)$ for the difference channel (D) takes place, with $S_n(i)$, $D_n(i)$, $G_n(i)$: Scanning values of the sum, difference and auxiliary channels in the frequency range for the sub-burst i, $n=0, 1, 2, \ldots N-1$, $K_s(i)$, $K_d(i)$ being scaling factors for the sub-burst $i+1$.

7. The method according to claim 6, wherein:

in a sub-burst i with $i=1 \ldots l-1$, the corresponding scaling factors $K_s(i)$ and $K_d(i)$ are determined;

said scaling factors are used to eliminate the side lobe jammer in the chronologically next following sub-burst $i+1$ with $i=1 \ldots l-1$; and the scaling factors for the sub-bursts i with $i=1 \ldots l-1$ are computed as follows:

$$K_s(i+1) = \frac{\sum_{n \in M} S_n(i) \cdot G_n^*(i)}{\sum_{n \in M} G_n(i) \cdot G_n^*(i)} \text{ and } K_d(i+1) = \frac{\sum_{n \in M} D_n(i) \cdot G_n^*(i)}{\sum_{n \in M} G_n(i) \cdot G_n^*(i)}$$

with $i=1, \ldots, l-1$,

M: clutter free signal range.

8. The method according to claim 7, wherein the scaling factors $K_s(1)$ and $K_d(1)$ of the first sub-burst $i=1$ are determined by:

performing an initialization phase whose length $P_I$ is shorter than P; and in the initialization phase, computing the scaling factors $K_s(1)$ and $K_d(1)$ according to:

$$K_s(1) = \frac{\sum_{n \in M} S_n(0) \cdot G_n^*(0)}{\sum_{n \in M} G_n(0) \cdot G_n^*(0)} \text{ and } K_d(1) = \frac{\sum_{n \in M} D_n(0) \cdot G_n^*(0)}{\sum_{n \in M} G_n(0) \cdot G_n^*(0)}$$

9. A method of suppressing jammer signals in a received signal of a radar antenna in an HPRF application, by means of Fast Fourier Transformation and side lobe cancellation, the radar antenna comprising sum, difference and auxiliary channels, said method comprising:

transforming the received signal in sum, difference and auxiliary channels, from the time domain into the frequency domain using a Fast Fourier Transformation;

suppressing the jammer signal by means of side lobe cancellation, in the frequency domain;

wherein the individual data $Y_n^S(i)$ and $Y_n^D(i)$ of the sum and difference channels are combined to a final value $Y_n^S$ and $Y_n^D$ of the sum and difference channels for the corresponding burst.

* * * * *